United States Patent [19]

Nakano et al.

[11] Patent Number: 4,780,651
[45] Date of Patent: Oct. 25, 1988

[54] SPEED CONTROL APPARATUS FOR A MOTOR

[75] Inventors: Hiromitsu Nakano, Hirakata; Masahiro Yasohara, Amagasaki, both of Japan

[73] Assignee: Matsushita Electric Industrial Co., Ltd., Osaka, Japan

[21] Appl. No.: 49,212

[22] Filed: May 13, 1987

[30] Foreign Application Priority Data

| May 14, 1986 [JP] | Japan | 61-110021 |
| May 22, 1986 [JP] | Japan | 61-117863 |
| May 22, 1986 [JP] | Japan | 61-117864 |

[51] Int. Cl.⁴ .............................. H02P 6/02
[52] U.S. Cl. ......................... 318/254; 318/138
[58] Field of Search ............... 318/138, 254, 439

[56] References Cited

U.S. PATENT DOCUMENTS

| 3,584,280 | 6/1971 | Inagaki | 318/254 |
| 3,611,081 | 10/1971 | Watson | 318/138 |
| 4,023,082 | 5/1977 | Tanikoshi | 318/138 |
| 4,070,606 | 1/1978 | Morozumi et al. | 318/254 A |
| 4,132,930 | 1/1979 | Schalk | 318/138 |
| 4,503,369 | 3/1985 | Nishijima et al. | 318/254 |

FOREIGN PATENT DOCUMENTS

| 60-91892 | 5/1985 | Japan | 318/254 |
| 61-135385 | 6/1986 | Japan | 318/254 |

*Primary Examiner*—Bentsu Ro
*Attorney, Agent, or Firm*—Birch, Stewart, Kolasch & Birch

[57] ABSTRACT

A speed control apparatus for a motor, wherein the counter-electromotive voltage is detected with great precision even when the counter-electromotive voltage to be caused from the motor driving coils is small or the ambient temperature is changed. The voltages corresponding to the detection voltages are turned into speed signals. The emitter resistance of the driving transistor, which is the cause of the torque reduction, can be removed, and uneven rotation, uneven torque is reduced. The speed control apparatus provides a composite voltage of driving coil voltages that are converted by an inversion amplifier. The voltage corresponding to the composite voltage provides the speed signal. This voltage is transferred to the driving coils and precise speed control is produced without a reduction in the controllable maximum torque or the starting torque.

8 Claims, 5 Drawing Sheets

SPEED CONTROL APPARATUS FOR A MOTOR

BACKGROUND OF THE INVENTION

The present invention relates to a speed controlling apparatus for a brushless motor.

In recent years, so-called brushless motors which have electronic switches using transistors, instead of the conventional DC motor provided with a mechanical switch mechanism such as a brush or commutator, are often used as driving motors for acoustic appliances and image appliances in order to have longer service life, higher reliability or a thinner shape. Also, although the counter-electromotive voltage caused in the driving coils is used or the AC tachogenerator for practical use as the speed controlling apparatus for the brushless motor is used, the use of the counter-electromotive voltage is generally advantageous in terms of construction simplicity, economy, etc. For example, "Base and Application of Precise Small Motor", written by Hiroshi Yamada (published by Sogo Denshi Shuppansha Co., Ltd., of Japan, July 1, 1975) shows the conventional art of the controlling apparatus using the counter-electromotive voltage at page 234.

One example of the above-described conventional motor speed controlling apparatus will be described hereinafter with reference to the drawings.

Figure 5:
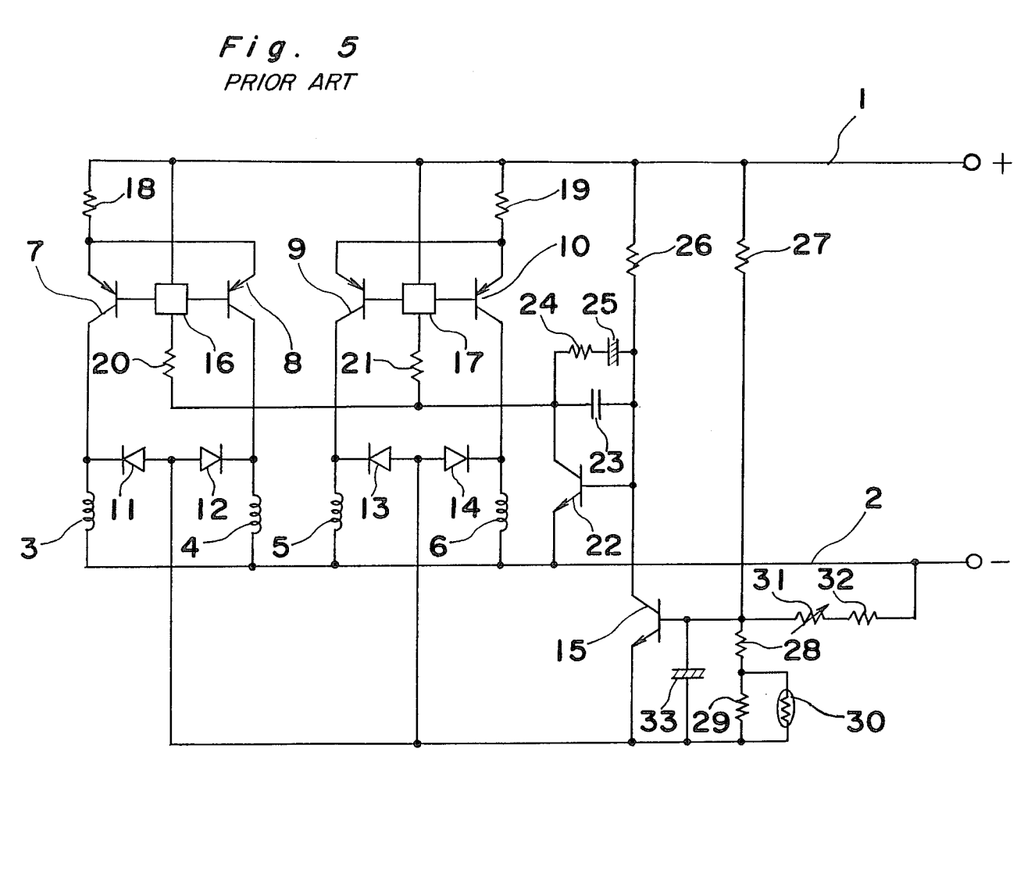
FIG. 5 is a circuit connection diagram of a speed control apparatus of the conventional motor as already referred above.

FIG. 5 is a circuit connection diagram for the motor speed controlling apparatus, which includes the positive-side and negative-side feeder lines 1 and 2 of the power supply and motor driving coils 3 through 6. One of each respective end of the driving coils 3 through 6 are connected with the negative-side feeder line 2. The respective ends are connected with the collectors of the driving transistors 7 through 10 and are connected with the cathode side of the diodes 11 through 14. The anode side of the diodes 11 through 14 are connected in common and are connected with the emitters of the transistor 15. The hall elements 16 and 17 are adapted to detect the positions of the permanent magnet rotors (not shown). One output terminal of the hall element 16 is connected with the base of the driving transistor 7, the other output terminal which is adapted to output a signal which has a phase difference of 180 degrees from the output terminal and is connected with the base of the driving transistor 8. The mutual emitters of the driving transmitters 7 and 8 are connected in common with the positive side feeder line 1 through the resistor 18. One output terminal of the hall element 17 is connected with the base of the driving transistor 9, the other output terminal which is adapted to output a signal which has a phase difference of 180 degrees from the output terminal and is connected with the base of the driving transistor 10. The mutual emitters of the driving transistors 9 and 10 are connected in common with the positive-side feeder line 1 through the resistor 19. One of each respective terminal of the hall elements 16 and 17 are respectively connected with the positive-side feeder line 1, also the other terminals are respectively connected with the collector of the transistor 22 through the resistors 20 and 21. The emitter of the transistor 22 is connected with the negative-side feeder line 2, and the base is being connected with the positive-side feeder line 1 through the resistor 26, with the collector of the transistor 15. The series circuit of the capacitor 23, the resistor 24 and the capacitor 25 are connected between the the collector and the base of the transistor 22. The base of the transistor 15 is connected with the positive-side feeder line 1 through the resistor 27, with the negative-side feeder line 2 through the series circuit of the variable resistor 31 and the resistor 32, with the emitter through the series circuit of the resistor 28 and the resistor 29. A thermistor 30 for temperature compensation is connected with both the ends of resistor 29. Also, the capacitor 33 is connected between the base and the emitter of the transistor 15.

The operation will be described hereinafter with reference to the motor speed controlling apparatus constructed hereinabove.

The motor shown in FIG. 5 is a brushless motor of four-phase one-direction energization, using two hall elements 16 and 17 and the four driving coils 3 through 6 as described hereinabove. Namely, the current controlled by the hall elements 16 and 17 through the permanent magnet rotator sequentially flows into the driving coils 3 through 6 which are positioned every 90 degrees so as to cause the rotating magnetic field. In this case, the current flowing into the driving coils 3 through 6 is proportional to the current flowing into the hall elements 16 and 17. The current flowing into the hall elements is turned into a value proportional to the speed error to control the motor torque.

Namely, the driving transistors 7 through 10 are sequentially switched. During the energization period that exists when the current does not flow into the driving coils 3 through 6 caused by the switching operation, the counter-electromotive voltage to be caused in the driving coils 3 through 6 is rectified by the diodes 11 through 14, smoothed, compared with the reference voltage and simplified in difference. The current proportional to the speed error flows into the transistor 22 controlling the current flow into the hall elements 16, 17 which controls the feed power amount of the driving transistors 7 through 10 so as to render the rotation speed constant.

As the rectification is effected across the diode to detect the counter-electromotive voltage in such construction as described hereinabove, the sequential direction voltage is changed by ambient temperature, This causes an error in the detection voltage of the counter-electromotive voltage, so that the rotation speed is changed. Thus, a thermistor 30 for temperature compensation or the like is required as in the conventional example of FIG. 5. Also, it is impossible to detect when the value of the counter-electromotive voltage caused is less than or equal to the sequential direction voltage of the diode.

Also, as the resistors 18, 19 are connected with the emitters of the driving transistors 7 through 10 in the above-described construction, the maximum voltage which may be applied across the driving coils 3 through 6 is reduced through the voltage drop. Namely, there is a problem that the controllable maximum torque of the motor and the starting torque will be lowered. Thus, in a motor where no tolerance of torque with respect to the power-supply voltage is allowed, the insertion of the resistors 18 and 19 is impossible to be performed. Accordingly, it is extremely difficult to produce uneven control, or uneven torque, which will be caused by the characteristic dispersion of the driving transistors 7 through 10. Also, the resistors 18, and 19 often require high power consumption and are disadvantageous despite in terms of lower prices, and smaller space.

SUMMARY OF THE INVENTION

Accordingly, an object of the present invention is to provide a speed controlling apparatus for a motor. Wherein, the counter-electromotive voltage is detected with better precision even when the counter-electromotive voltage caused from the motor driving coils is small or even when the ambient temperature is changed. The voltages corresponding to the detection voltages are turned into the speed signals.

Another object of the present invention is to provide a speed controlling apparatus for a motor. Wherein, the emitter resistance of the driving transistor, which is the cause of the torque reduction, can be removed, and uneven rotation, and uneven torque are reduced.

For the solution of the conventional problems, the present invention is to provide a speed controlling apparatus for a motor. The apparatus includes motor driving coils of plural phases connected at the respective ends with feeder line, and a plurality of driving transistors connected with the other respective end of the driving coils. The apparatus further include a position detector for obtaining signals corresponding to the position of a rotor of said motor. A current switching circuit which reacts to the signal of the position detector to sequentially switch the energization condition into the driving transistor, and has a speed detecting apparatus which is composed of a plurality of inversion amplifiers that have the respective terminal voltages of the driving coils applied upon the respective inversion input terminals and have the voltage of one of the feeder lines applied upon the respective non-inversion input terminals. A means for composing the output signals of a plurality of inversion amplifiers is also provided as part of said apparatus as is an error amplifying circuit for amplifying the error between the voltage corresponding to the composite signal, i.e., the output signal of the speed detecting apparatus and the reference voltage. An error signal transfer means for transferring the output of the error amplifying circuit to the driving transistor includes a current switching circuit. Lastly, driving output composing means is provided for composing each output of the plurality of driving transistors to connect the output of the driving output composing means with the input of the error signal transfer means, so that the output of the error signal transfer means is fed into the input of the driving transistor to control the feed power amount of the driving transistor to control the motor speed to a set speed.

According to the present invention, the voltages caused in the driving coils of each phase are converted into the inversion signals by the inversion amplifier with the voltage of one of the feeder lines as the reference. The output signals of the respective inversion amplifiers are composed to provide the composite voltage, which envelopes the largest absolute value of the counter electromotive voltages of each phase, so that the voltage corresponding to the composite voltage is provided as the speed signal. Thus, the precise speed detection may be formed.

Also, the power corresponding to the speed error signal may be transferred into the driving coils without interphase dispersion and the emitter resistance of the driving transistor becomes unnecessary, so that the precise speed control may be performed without reduction in the controllable maximum torque and the starting torque.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are disignated by like reference numerals throughout the accompanying drawings.

Figure 1:
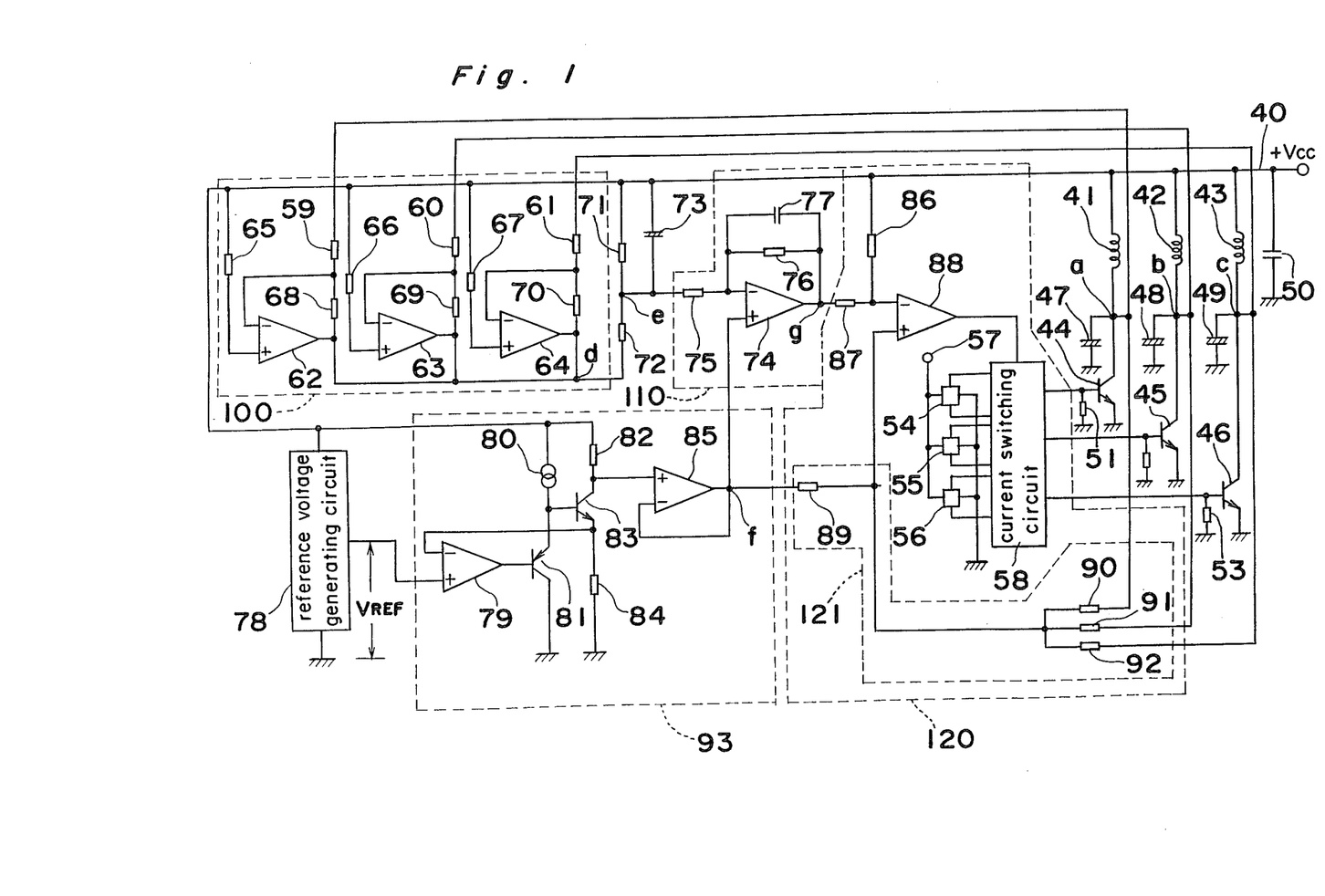
FIG. 1 is a circuit diagram of a speed control apparatus for a motor in the embodiment of the present invention.

Referring now to the drawings, FIG. 1 shows a circuit construction diagram for a motor according to one preferred embodiment of the present invention, which includes a positive-side feeder line of the power supply 40, motor driving coils 41, 42 and 43. The respective ends of the driving coils 41, 42 and 43 are connected with the feeder line 40. Also, the other respective ends are connected with the collectors of the driving transistors 44, 45 and 46, the connection points being called a, b and c, respectively. The respective capacitors 47, 48 and 49 are connected between the ground and the connection points a, b and c. A capacitor 50 is connected with the feeder line 40 and the ground. The emitters of the driving transistors 44, 45 and 46 are respectively grounded, with the bases being respectively grounded through the resistors 51, 52 and 53. Position detectors 54, 55 and 56 are composed of, for example, a hall element or the like to detect the position of a rotor such as permanent magnetic rotor (not shown). The input terminals are respectively connected in parallel between the feed terminals 57 and the ground, and the output terminals are respectively connected with a current switching circuit 58. The output terminals of the current switching circuit 58 are connected with the bases of the driving transistors 44, 45 and 46. The connecting points a, b and c are respectively connected with the inversion input terminals of the inversion amplifiers 62, 63 and 64 through resistors 59, 60 and 61. The non-inversion input terminals of the inversion amplifiers 62, 63 and 64 are respectively connected with the feeder line 40 through the resistors 65, 66 and 67, and the output terminals are respectively connected with the inversion input terminals through the resistors 68, 69 and 70 and are connected in common. The common connection point is assumed to be d. A voltage dividing circuit composed of resistor 71 and 72 is connected between the feeder line 40 and the common connection point d. The voltage dividing point is assumed to be e. A capacitor 73 is connected between the feeder line 40 and the voltage dividing point e. The voltage dividing point e is connected with the inversion input terminal of an error amplifier 74 through the resistor 75, and the output terminal of the error amplifier 74 is connected with the inversion input terminal through the parallel circuit of the resistor 76 and the capacitor 77.

The output terminal of the reference voltage generating circuit 78 is connected with the non-inversion input terminal of the amplifier 79. The output terminal of the amplifier 79 is connected with the base of the transistor 81 having the collector grounded. The emitter of the transistor 81 is connected with the base of the transistor 83 and feeder line 40 through the constant-current source 80. The emitter of the transistor 83 is grounded through the resistor 84 and is connected with the inversion input terminal of the amplifier 79. The collector is connected with the feeder line 40 through the resistor 82 and with the non-inversion input terminal of the amplifier 85. The output terminal of the amplifier 85 is connected with the inversion input terminal to constitute a voltage follower. The output point of the voltage follower is assumed to be f. The output point f is connected with the non-inversion input terminal of the error amplifier 74 and with the non-inversion input terminal of the amplifier 88 through the resistor 89. The output terminal of the error amplifier 74 is connected with the feeder line 40 through the voltage-dividing circuit of the resistor 87 and 86. The voltage dividing point of the voltage-dividing circuit is connected with the inversion input terminal of the amplifier 88. The output of the amplifier 88 is connected with the current switching circuit 58. Furthermore, the connection points a, b and c are respectively connected with points of the resistors 90, 91 and 92, and the other ends of the resistors 90, 91 and 92 are commonly connected with the non-inversion input terminal of the amplifier 88.

Figure 2:
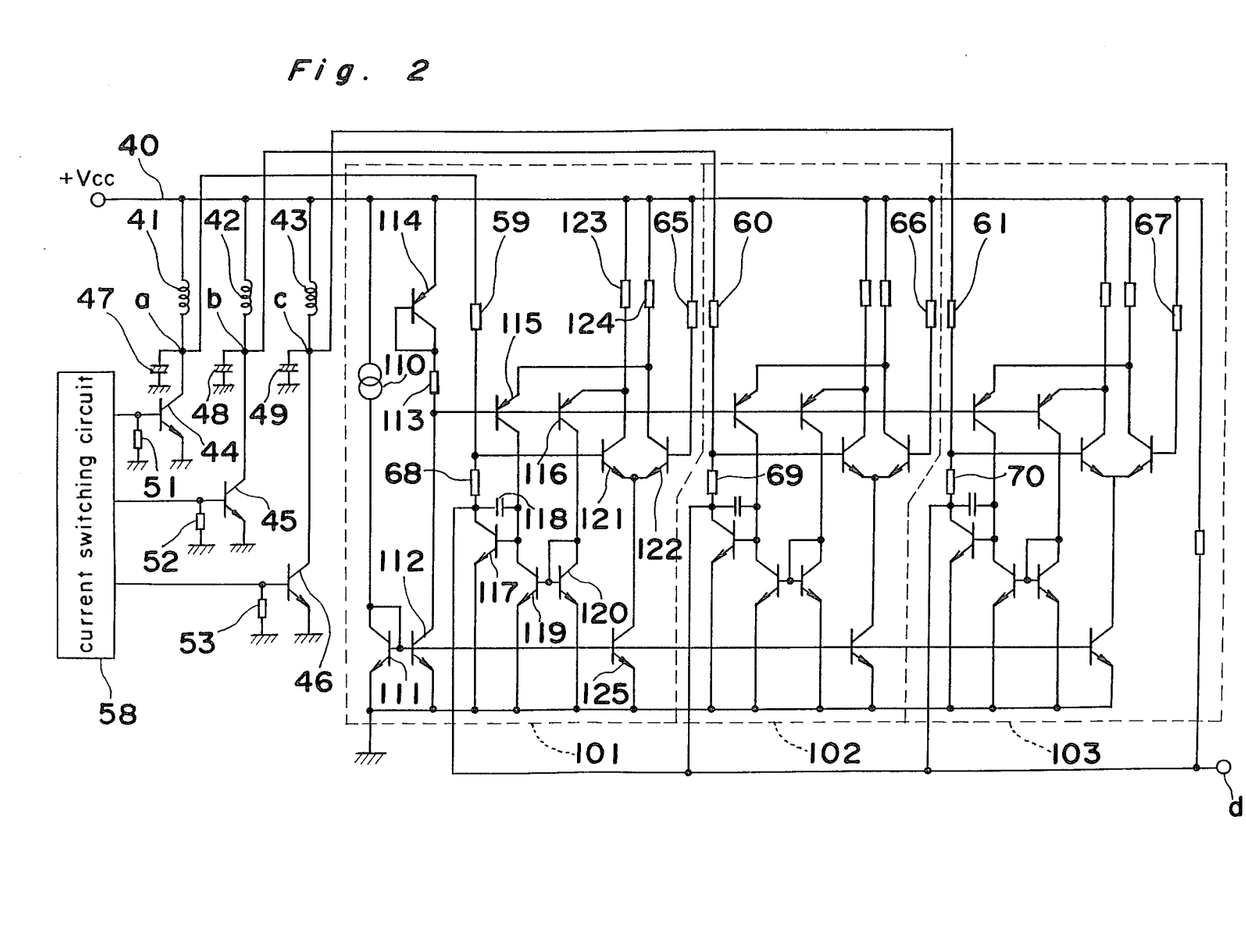
FIG. 2 is a circuit connection diagram showing one concrete example of an inversion amplifier employed in the apparatus of FIG. 1.

FIG. 2 shows one example of the concrete circuit connection diagram of the inversion amplifiers 62, 63 and 64. The inversion amplifiers 62, 63, 64 and the peripheral circuit in FIG. 1 correspond to the blocks 101, 102, 103 surrounded by the respective broken lines of FIG. 2. The construction elements of FIG. 1 have the same reference numerals as in FIG. 2. Also, as the blocks 101, 102, 103 are of the same construction, the blocks 102, 103 are omitted in description although the block 101 is described in detail. The transistor 111 has the base and the collector connected together, is connected with the feeder line 40 through the constant-current source 110 and is connected with the base of the transistor 112. The emitters of the transistors 111, 112 are grounded. The collector of the transistor 112 is connected with the feeder line 40 through the resistor 113 and the diode-connected transistor 114. The connection point a between the motor driving coil 41 and the collector of the driving transistor 44 is connected with the base of the transistor 121 through the resistor 59. The transistor 121 and the transistor 122 have the emitter commonly connected to constitute a differential transistor pair. The emitter common connection point is connected with the collector of the transistor 125, and the base of the transistor 125 is connected with the base of the transistor 111 with the emitter being grounded. The collector of the transistor 121 is connected with the feeder line 40 through the resistor 123 and is connected with the emitter of the transistor 116. The collector of the transistor 122 is connected with the feeder line 40 through the resistor 124, and is connected with the emitter of the transistor 115 with the base being connected with the feeder line 40 through the resistor 65. The transistors 115, and 116 have their bases commonly connected and are connected with the connection point between the resistor 113 and the collector of the transistor 112. The collector of the transistor 115 is connected which has base of the transistor 117 with the its emitter grounded and is connected with the collector of the transistor 119. The collector of the transistor 117, i.e., the output terminal of the block 101 is connected with the base of the transistor 121 through the resistor 68, is commonly connected with the output terminals of the other blocks 102, 103 and with the terminal d. A phase compensation capacitor 118 is connected between the collector and the base of the transistor 117. The collector of the transistor 116 is connected with the collector and the base of the transistor 120 and the base of the transistor 119. Also, the emitters of the transistors 119 and 120 are mutually grounded.

Figure 3:
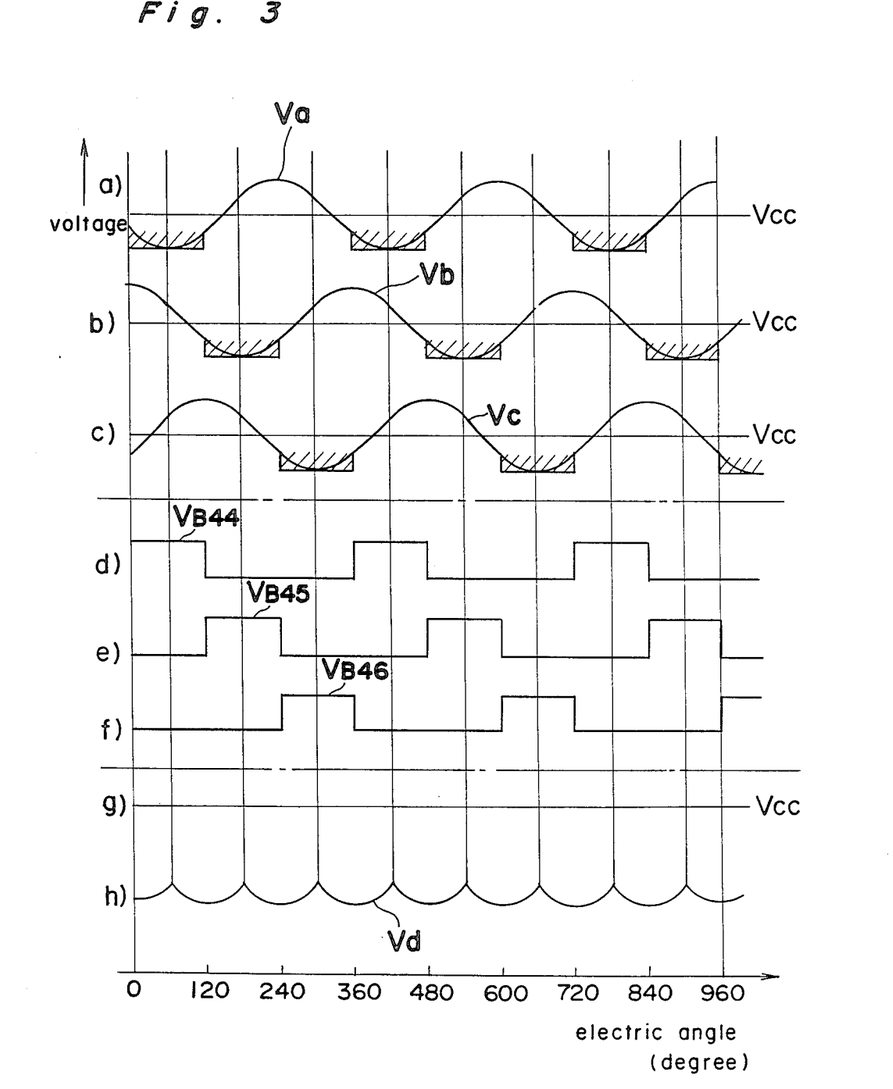
FIG. 3 and FIG. 4 are the signal wave form charts of the respective points in FIG. 1.

The speed control apparatus of the motor constructed as described hereinabove will be described hereinafter in operation with reference to FIG. 1, FIG. 2, FIG. 3 and FIG. 4. FIG. 3 shows the signal waveform graphs of the respective points in FIG. 1. Reference characters Va, Vb and Vc are respectively the generated voltages of the a, b and c, reference characters $V_{B44}$, $V_{B45}$, and $V_{B46}$ are respectively the base voltages of the driving transistors 44, 45 and 46, also reference character Vd shows a composite signal of the output common connection point d of the inversion amplifiers 62, 63 and 64.

First, the position of the NS magnetized permanent magnet rotor is detected by a position detectors 54, 55, 56. The position detection signal is processed in the current switching circuit 58 so that the energization switching signals which are sequentially changed over for 120-degree energization period. For 240-degree quiescent period at such electric angles as shown in the $V_{B44}$, $V_{B45}$, $V_{B46}$ of FIG. 3, the base of the driving transistors 44, 45, 46 are applied. The driving coils are sequentially energized in accordance with the energization switching signal to rotate the motor. The sine-wave-shaped counter electromotive voltages with the voltage of the feeder line 40 at the center are caused through the driving coils 41, 42, and 43 through the rotation. In FIG. 3, Va, Vb, and Vc show the condition. The oblique portion is the energization period and the other period is the energization stop period to produce the counter-electromotive voltages. The counter-electromotive voltages Va, Vb and Vc have the phase difference of 120 degrees with respect to each other. As the method of processing the three signals is the same, the signal processing of the Va will be described in detail.

The counter-electromotive voltage Va is applied upon inversion input terminal of the inversion amplifier 62. As one example of the concrete circuit connection of the inversion amplifier 62 is provided as shown in FIG. 2, the voltage Va is input to the base of one transistor 121 which constitutes the differential transistor pair through the resistor 59. The voltage of the feeder line 40 is input into the base of the other transistor 122 of the differential transistor pair. The voltage of the feeder line 40 is assumed as Vcc. When the Va becomes higher than Vcc, the collector current of the transistor 121 increases which decreases the collector current of the transistor 122, so that the voltage drop of the resistor 123 becomes larger than the voltage drop of the resistor 124. As the voltage of the base common connection point of the transistors 115 and 116 is kept constant into the total voltage of the sequential direction voltage of the diode-connected transistor 114 and the voltage drop of the resistor 113 through which the constant current flows, the voltage between the emitter and the base of the transistor 115 becomes larger than that of the transistor 116, so that the collector current of the transistor 115 increases which decreases the collector current of the transistor 116. Also, the collector currents of the transistors 119 and 120 constructing the current mirror circuit are equal. Thus, the base current of the output transistor 117 increases, the voltage between the collector and the emitter decreases to reduce the output voltage. Also, when Va becomes lower than Vcc, the output voltage increases by the circuit operation opposite to the description above. The connection is made to the base of the transistor 121 through the collector feedback resistor 68, so that the gain of the amplifier is determined by the resistance ratio of the resistor 59 and the resistor 68. Assume that the two resistance values are equal, the collector of the output transistor 117, i.e., the output signal from the circuit block 101 becomes the signal, wherein the counter-electromotive voltage Va as the input signal is reversed with the voltage level Vcc of the feeder line 40 as the reference. Similarly, the counter-electromotive voltage Vb, the counter-electromotive voltage Vc are converted into inverse signals, respectively at the circuit block 102, at the circuit block 103 with Vcc being inverse of as the reference. As the collectors of the respective output transistors of the circuit blocks 101, 102 and 103 are commonly connected and are connected with the terminal d, the lowest voltage among the collector voltages of three output transistors has priority as the signal of the terminal d. The composite signal waveform becomes the ripple waveform in accordance with the size of the counter-electromotive voltage with 120 degrees as one period of an electric angle as in Vd of FIG. 3. Namely, this signal becomes the signal at the lower voltage level with the Vcc as the reference when the speed of the motor becomes higher to increase the counter-electromotive voltage to be caused in each driving coil. On the other hand, when the speed becomes lower, the signal level becomes higher. As apparent from the above-described description, the output signals of the inversion amplifiers 62, 63 and 64 are composed so that the counter-electromotive voltages of the respective energization quiescent periods of motor driving coils 41, 42, 43 may be detected together in three phase portions, with the accuracy of the detection voltage being much better as long as the output transistor of the inversion amplifiers 62, 63, 64 does not become saturated in this condition.

The composite signal Vd of the three phase of counter-electromotive voltage as shown in FIG. 3 is divided in voltage and smoothed by the resistors 71, 72 and the capacitor 73 as shown in FIG. 1, and is converted into the DC voltage, i.e., the speed voltage in accordance with the speed. On the other hand, the output voltage $V_{REF}$ of the reference voltage generating circuit 78 is converted into the voltage of the Vcc reference through the reference level converting circuit 93. The reference level converting circuit 93 will be described hereinafter. The output voltage from the reference voltage generating circuit 78 is input into the non-inversion input terminal of the amplifier 79, also the terminal voltage of the resistor 84 is input into the inversion input terminal. Assume that the amplification ratios of the amplifiers 79, and the transistors 81, 83 are extremely large, two input terminals of the amplifier 79 become the imaginary short so that the terminal voltage of the resistor 84 becomes $V_{REF}$. When the value of the resistor 84 is equal to that of the resistor 82, the terminal voltage of the resistor 82 becomes also $V_{REF}$. The reference voltage $V_{REF}$ with the Vcc as the reference may be generated in the connection point f through the voltage follower 85. The speed voltage and the reference voltage with the Vcc as the reference are compared with each other by the error amplifier 74 to amplify the error to input it into the current switching circuit 58 through the amplifier 88 constituting the buffer. The current switching circuit 58 controls the energization, quiescent timing of the driving transistors 44, 45 and 46 in accordance with the signals from the position detectors 54, 55 and 56 to feed the signal in accordance with the size of the signal from the amplifier 88 into the bases of the driving transistors 44, 45 and 46, so that the speed of the motor may be controlled through the control of the feed amount.

Figure 4:
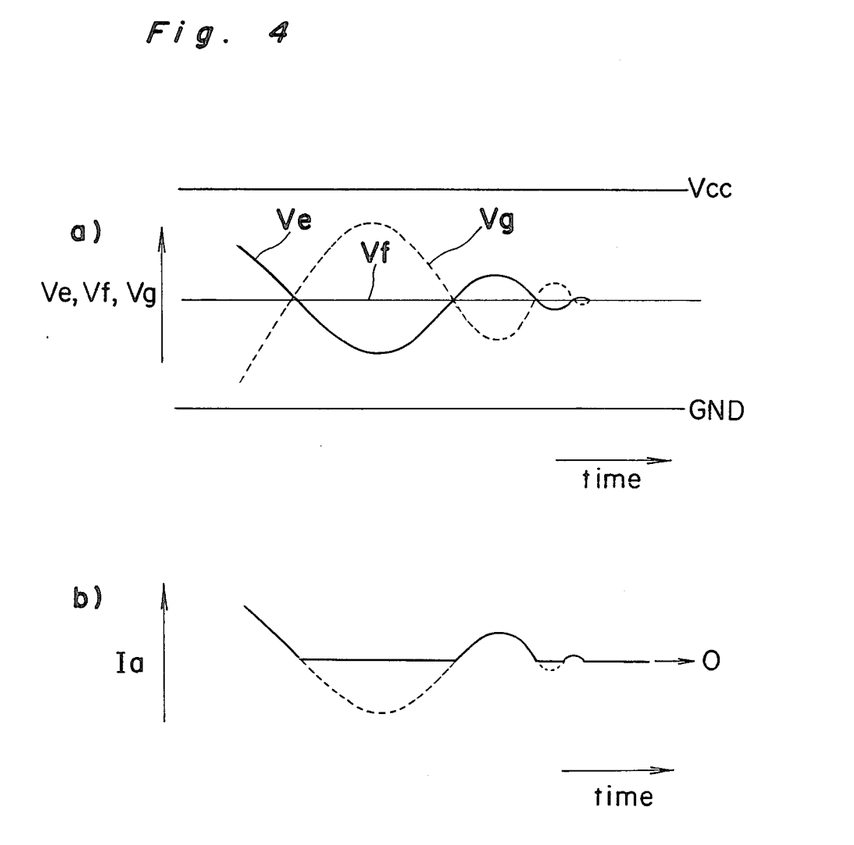

The voltage Vd of the d point in FIG. 1 changes in accordance with the speed of the motor. The voltage Vd is divided in voltage and smoothed by the resistors 71, 72 and the capacitor 73, and is converted into a DC voltage, i.e., a speed voltage Ve (see FIG. 4). On the other hand, the output voltage $V_{REF}$ of the reference voltage generating circuit 78 is converted into the voltage Vf of the Vcc reference through the reference level converting circuit 93. The error amplifier 74 amplifies the error between the speed voltage Ve and the reference voltage Vf to output the error voltage Vg. The facts of this matter are shown in FIG. 4. The error voltage Vg is input into a current switching circuit 58 through an amplifier 88 constituting the buffer. The current switching circuit 58 controls the energization, quiescent timings of the driving transistors 44, 45 and 46 in accordance with the signals from the position detectors 54, 55 and 56 so that the signals in accordance with the size of the signal from the amplifier 88 are adapted to be fed to the bases of the driving transistors 44, 45 and 46. Also, the collector outputs of the driving transistors 44, 45 and 46 constitute the negative feedback loop with respect to the inputs of the amplifier 88 through the resistors 90, 91 and 92. Accordingly, the feed power amount to the driving coil may be controlled without interphase dispersion in accordance with the error voltage Vg. Namely, in FIG. 1, assume that the values of resistors 86, 87, 89 through 92 are respectively R86, R87, R89 through R92, the imaginary short between both the inputs of the amplifier 88 is provided, the input terminal voltage is V1.

$$V1 = Vg + \frac{R_{87}}{R_{86} + R_{87}} (Vcc - Vg) \quad (1)$$

$$\frac{1}{R_{89}}(V1 - Vf) = \frac{1}{R_{90}}(Va - V1) + \frac{1}{R_{91}}(Vb - V1) + \frac{1}{R_{92}}(Vc - V1) \quad (2)$$

In the above-described equations, if the following conditions are given, $Rs = R_{87} = R_{89}$ $Rf = R_{86} = \frac{1}{3} R_{90} = \frac{1}{3} R_{91} = \frac{1}{3} R_{92}$, then, $$V1 = Vg + \frac{Rs}{Rf + Rs} (Vcc - Vg) \quad (3)$$

-continued $$Va + Vb + Vc - 3V1 = \frac{3Rf}{Rs}(V1 - Vf) \quad (4)$$

wherein, as Va, Vb, Vc are sine waves respectively having the phase difference of 120 degrees and amplitude around the Vcc as shown in FIG. 3, each of the composite waveforms follows with the internal impedance Za of the driving coil and, the current Ia thereof.

$$Va + Vb + Vc = 3Vcc - IaZa \quad (5)$$

From equation (4) and equation (5), $$IaZa = 3(Vcc - V1) - \frac{3Rf}{Rs}(V1 - Vf) \quad (6)$$

From equation (3) and equation (6), $$IaZa = -3\frac{Rf}{Rs}(Vg - Vf) \quad (7)$$

$$\therefore Ia = -3\frac{Rf}{Rs}(Vg - Vf) \cdot \frac{1}{Za} \quad (8)$$

As shown by equation (8), the energization current Ia into the driving coil is proportional to the difference between the error voltage Vg and the reference voltage Vf. Namely, the energization current Ia is controlled in accordance with the error voltage Vg independently of the dispersion of the driving transistors 44, 45 and 46. The condition is shown in Ia of FIG. 4.

Referring to FIG. 4, the Ia broken-line portion is the current in the negative direction. In the actual operation, only the current in the emitter direction exists from the collector of the driving transistor. Accordingly, the current between them becomes zero.

According to the present embodiment as described hereinabove, the negative feedback loop is provided into the input of the amplifier 88 through the resistors 90, 91 and 92 with respect to collector output of the driving transistors 44, 45 and 46 so that the current in accordance with the error voltage Vg may be fed without the interphase dispersion into the driving coils 41, 42 and 43, without reduction in the controllable maximum torque of the motor and the starting torque, thus resulting in the superior control characteristics.

As is clear from the foregoing description, according to the arrangement of the present invention, a plurality of inversion amplifiers wherein the respective terminal voltages of the motor driving coils are applied upon the respective inversion input terminals. The voltages of one feeder line are applied upon the respective noninversion input terminals, and means for composing the output signals of said plurality of inversion amplifiers are provided. As the amount of feed power the driving transistor is adapted to be controlled through the amplification of the error between the voltage corresponding to the composite signal and the reference voltage and through the feeding operation of the error into the inputs of the driving transistor, the counter-electromotive voltage to be generated in the driving coil may be detected with superior accuracy unless the output transistor of the reversion amplifier becomes saturated. Also, a rectification diode for the counter-voltage detection use, which is necessary, becomes unnecessary, the counter-electromotive voltage to be generated, even when it is small, may be detected, also, the error of the detection voltage through the variation in the ambient temperature may be removed. Accordingly, the superior speed controlling apparatus for the motor may be realized.

Also, an error signal transfer means is provided with a driving output composing means for each output of the driving transistor. The negative feedback loops are provided on each output of the driving transistor and on the input of the error signal transfer means through the driving output composing means, so that the control characteristics, the controllable maximum torque of the motor, and the starting torque may be improved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A speed controlling apparatus for a motor having a rotor and a plurality of phase motor driving coils said apparatus comprising:

a voltage feeder line connected to a first end of each said motor driving coil;

a plurality of driving transistors connected to a second end of each said motor driving coil;

a position detector for obtaining signals corresponding to the position of the rotor;

current switching circuit means, responsive to the signals developed by said position detector, for sequentially switching the energization condition of said driving transistors;

a plurality of inversion amplifiers, each having an inversion and a non-inversion input terminal, the respective terminal voltages of said motor driving coils being applied to the respective inversion input terminals of said inversion amplifiers, the voltage supplied by said feeder line being applied to the respective non-inversion input terminals of said inversion amplifiers, each said inversion amplifier developing a voltage difference output signal;

means for developing a composite signal voltage from the composite of said voltage different output signals of said plurality of inversion amplifiers; and comparator means for developing an error signal between the composite signal voltage and a reference voltage, for amplifying the error signal and for feeding the amplified error signal to said current switching circuit means, thereby controlling the feed power of each said driving transistor to maintain the speed of the motor constant.

2. The speed controlling apparatus for a motor in accordance with claim 1, wherein the inversion input terminal of each of said inversion amplifiers is connected to an associated motor driving coil and the corresponding driving transistor through a first resistor, the non-inversion input terminal of each of said inversion amplifiers being connected with said voltage feeder line, the output terminals of each of said inversion amplifiers being operatively connected with their inversion input terminals through a second resistor to form a feedback path; and said means for developing a composite signal voltage of said voltage difference output signals being formed with each output terminal of said inversion amplifier connected in common and being connected with said voltage feeder line through a third resistor.

3. The speed control apparatus as claimed in claim 1, wherein the amplified error signal is zero when the error signal is greater than the reference voltage.

4. A speed controlling apparatus for a motor having a rotor and a plurality of phase motor driving coils, the apparatus comprising:
- a voltage feeder line connected to one end of each motor driving coil;
- a plurality of driving transistors connected with the other end of each motor driving coil;
- a position detector for obtaining signals corresponding to the position of the rotor;
- current switching circuit means, responsive to the signals developed by the said position detector, for sequentially switching the energization condition of said driving transistor;
- speed detecting means, operatively connected to said motor, for developing a speed output signal voltage corresponding to the speed of the motor;
- an error amplifying circuit, responsive to the speed output signal voltage of said speed detecting means, for developing an error signal from the speed output signal voltage of said speed detecting means and a reference voltage, for amplifying the error signal and for outputting the amplified error signal;
- driving output composing means, operatively connected to each said driving transistor, for developing a composite signal of the outputs of each said plurality of driving transistors; and
- error signal transfer means, responsive to said error amplifying circuit and said driving output composing means, for developing a drive signal output, said drive signal output being supplied to said driving transistors to drive said motor.

5. The speed controlling apparatus for a motor in accordance with claim 4, wherein said driving output composing means includes a plurality of resistors which are connected at one end with each output terminal of said plurality of driving transistors and are connected all in common at another end to provide the output of said driving output composing means; and wherein said error signal transfer means includes a amplifier for outputting signals to be supplied to the inputs of said plurality of driving transistors.

6. The speed control apparatus as claimed in claim 4, wherein the drive signal output is zero when the amplified error signal is greater than the reference voltage.

7. A speed controlling apparatus for a motor having a rotor and a plurality of phase motor driving coils, said apparatus comprising:
- a speed detecting device;
- a feeder line connected to a first end of each said motor driving coil;
- a plurality of driving transistors connected with a respective second end of said driving coils;
- a current switching circuit sequentially energizing said driving transistors;
- a plurality of inversion amplifiers, each having an inversion and a non-inversion input terminal, the respective terminal voltages of said driving coils being applied to the respective inversion input terminals of said inversion amplifiers, the voltage of said feeder line being applied to the non-inversion input terminals of said inversion amplifiers, said inversion amplifiers each developing a voltage difference output signal; and
- means for developing a composite signal voltage from the composite of said voltage difference output signals of said plurality of inversion amplifiers by connecting the respective output terminals of the inversion amplifiers in common, thereby outputting said composite signal voltage.

8. The speed controlling apparatus for a motor provided with the speed detecting device in accordance with claim 7, wherein the inversion input terminals of the plurality of inversion amplifiers are respectfully connected with the connection point between the motor driving coils and the driving transistors through a first resistor, the non-inversion input terminal being operatively connected with said inversion input terminal through a second resistor; and said means for developing the composite signal voltage from the composite of said voltage difference output signals of said plurality of inversion amplifiers by connecting the output of said means for developing to the voltage feeder line through a third resistor.

* * * * *